Feb. 16, 1932.    R. WILLIAMS    1,845,068
METHOD OF AND APPARATUS FOR EFFECTING SYNTHESES
Filed Feb. 2, 1926    3 Sheets-Sheet 1
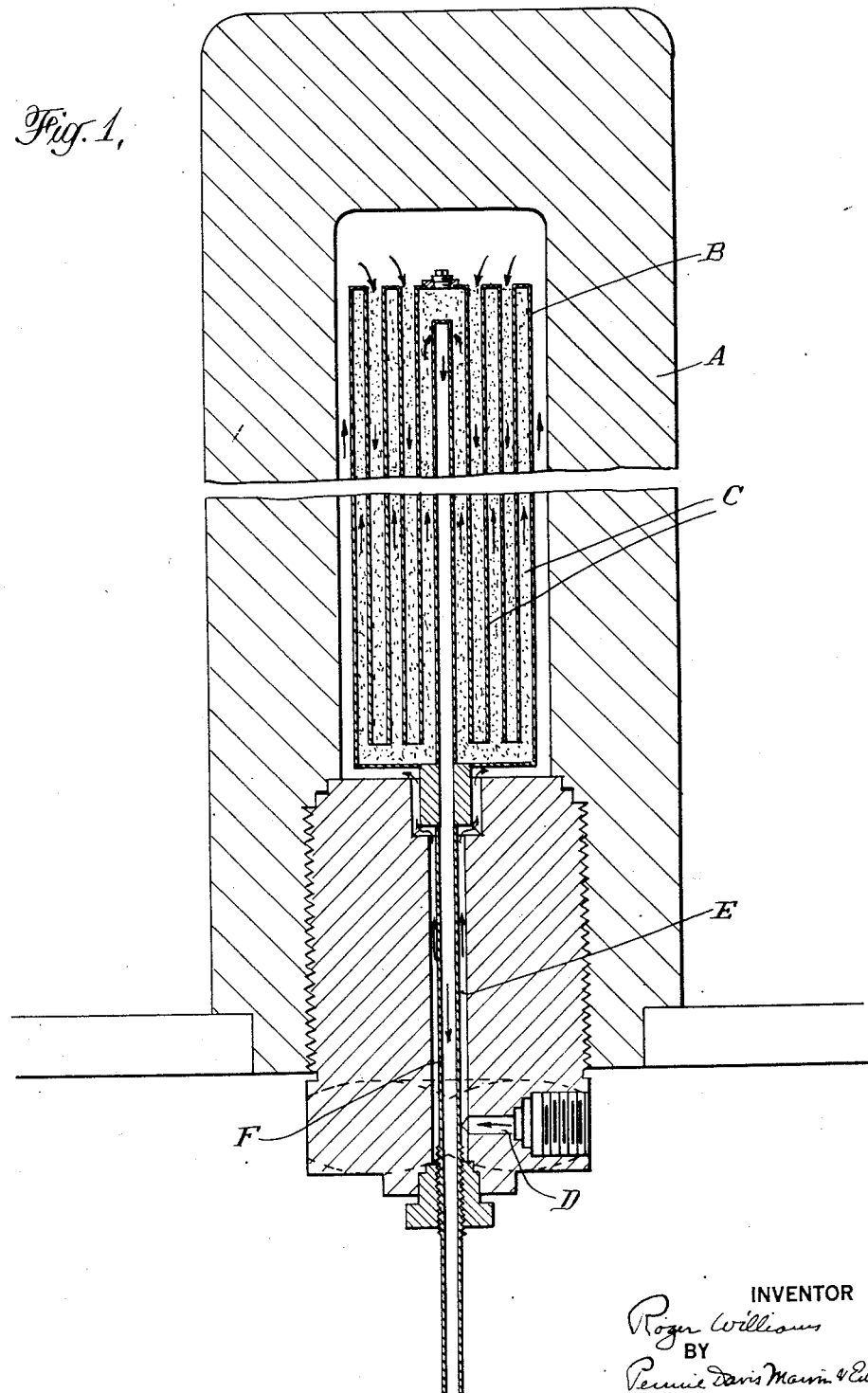

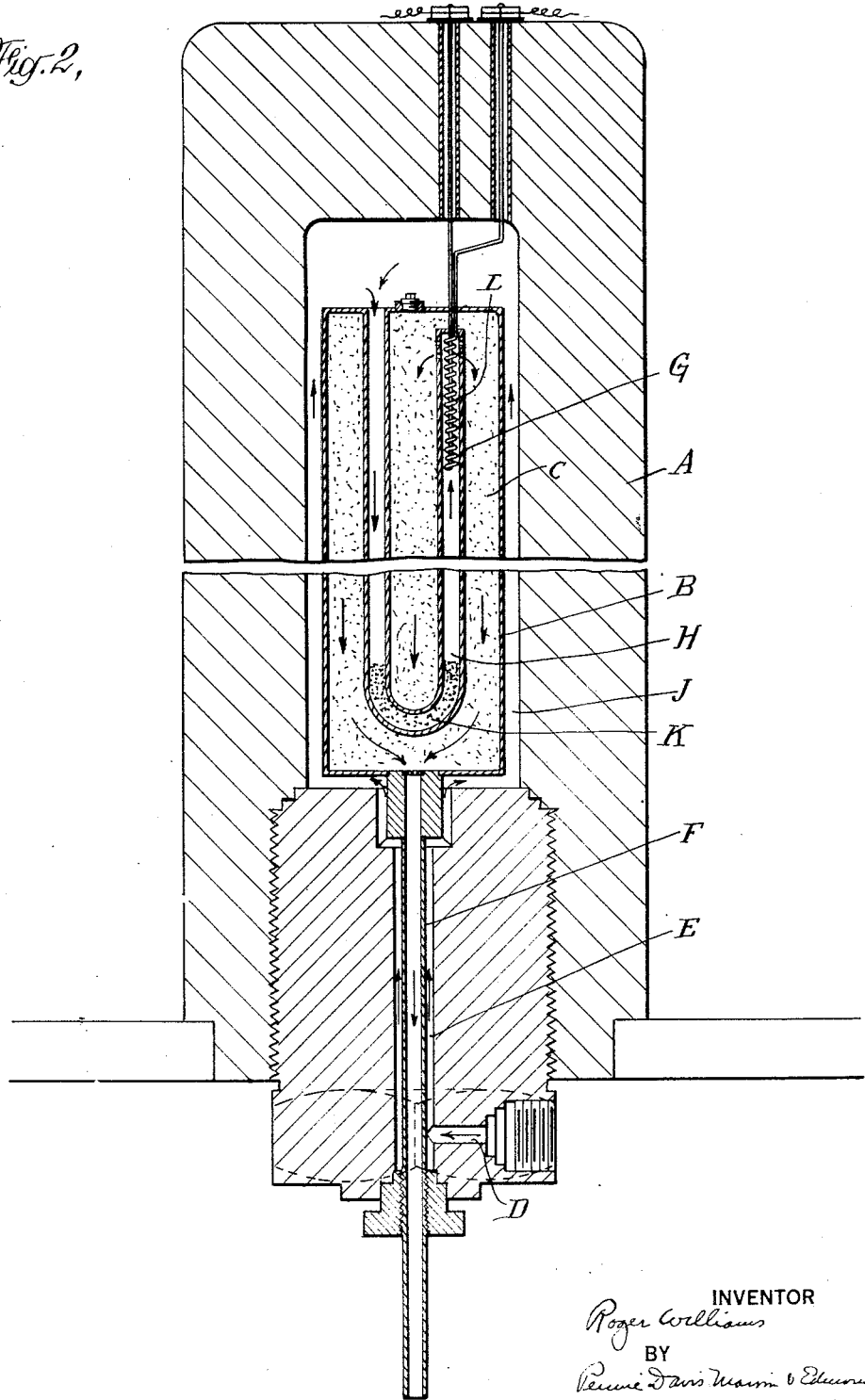

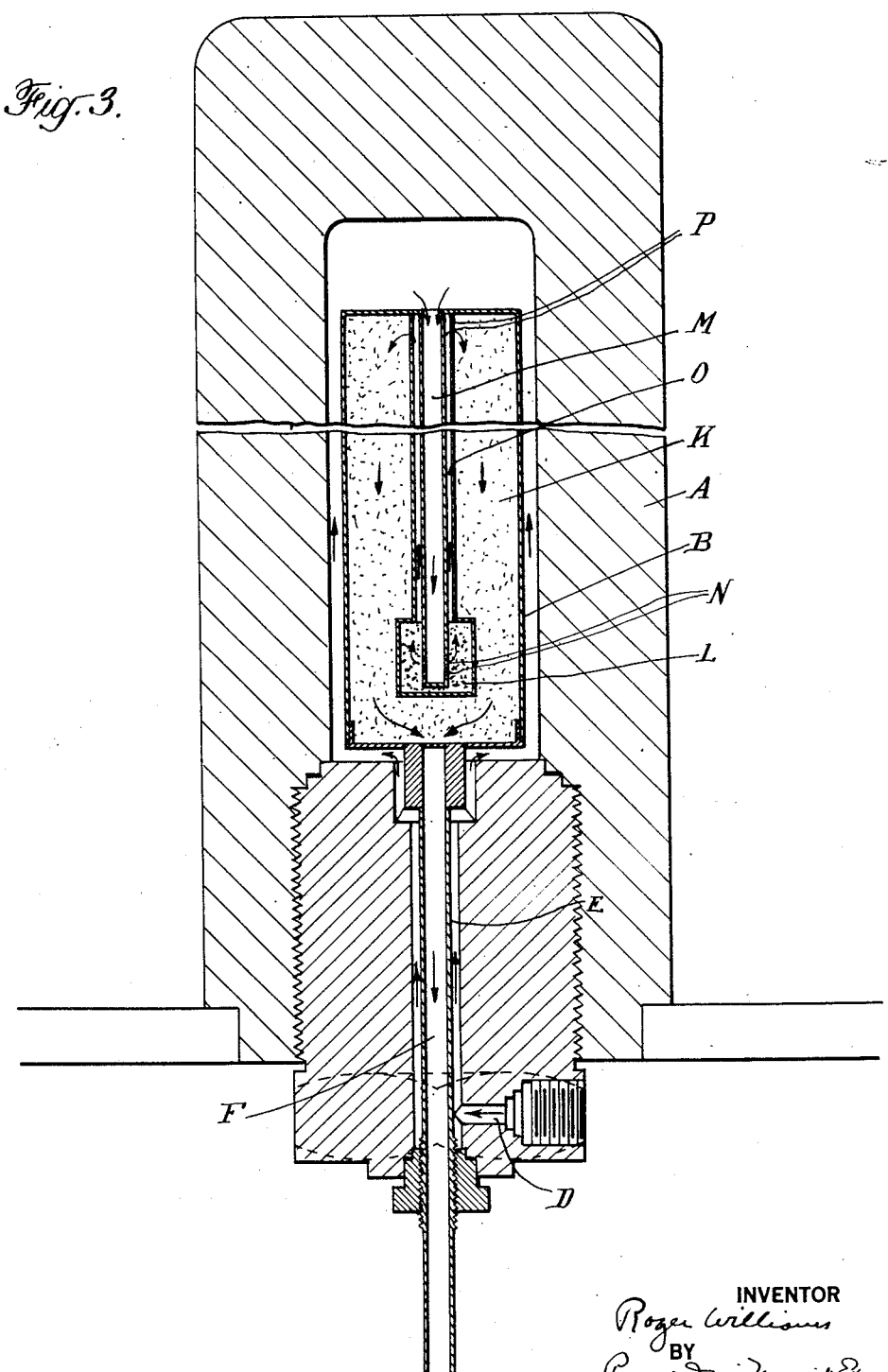

Patented Feb. 16, 1932

1,845,068

UNITED STATES PATENT OFFICE

ROGER WILLIAMS, OF WILMINGTON, DELAWARE, ASSIGNOR, BY MESNE ASSIGNMENTS, TO E. I. DU PONT DE NEMOURS & COMPANY, OF WILMINGTON, DELAWARE, A CORPORATION OF DELAWARE

METHOD OF AND APPARATUS FOR EFFECTING SYNTHESES

Application filed February 2, 1926. Serial No. 85,497.

This invention relates to catalytic exothermic gaseous reactions.

In carrying out catalytic exothermic gaseous reactions, particularly those which, like the synthesis of ammonia, may be advantageously effected under pressure, it is necessary that the apparatus be so designed and the conditions of operation be such that the gases to react are heated to a temperature, hereinafter referred to as the "reaction temperature," at which the reaction will actively proceed. Otherwise, the reaction will be difficult to start and, having been started, may be extinguished by the too cold gases.

The incoming gases may be brought to reaction temperature by heat exchange with either the hot gaseous products of the reaction or the catalyst. The latter method is especially advantageous, since at the same time that the entering gases are being warmed heat is being removed from the catalyst. Without some such provision for removing heat from the catalyst, the excessive temperature developed may result in unfavorable equilibrium conditions, injury to the catalyst, or in acceleration of undesirable side reactions. The means employed for passing the incoming gases in heat exchange relation to the catalyst may comprise passages surrounding the catalyst or tubes within the catalyst. In the latter case, the gases may be made to flow in a single tube or in a plurality of tubes, in one or more directions in indirect contact with the catalyst before contacting directly therewith.

In operating any apparatus for effecting catalytic exothermic gaseous reactions in which the incoming gases are warmed by heat exchange with either the exit gases, the catalyst, or both, it is impossible to control the heating so that the gases will arrive at the catalyst always at a temperature just sufficient to permit of the active commencement of the reaction. In practice there will be times when, because of fluctuations in the temperature or composition of the incoming gases, or of other causes, the gases will arrive at the catalyst at too low a temperature. Such a condition, as is obvious, though existing only momentarily, tends toward the extinction of the reaction.

One method of safeguarding a process against such a contingency is to provide an excess of heat exchange means so that the gases when they first contact with the catalyst will be normally at a temperature somewhat higher than the reaction temperature. In this way, protection is afforded against the occasional circumstance wherein the entering gases are abnormally cooled and tend to extinguish the reaction. This expedient, while effective with respect to the conditions it is designed to correct, has certain disadvantages. If sufficient heat exchange means is provided to insure that the gases first contacting with the catalyst are normally at a temperature higher than the reaction temperature, a portion of the space within the apparatus will necessarily be occupied by heat exchange means which, during the greater part of the time, is superfluous. While such an uneconomical utilization of space is generally undersirable, it is particularly so in the case of high pressure syntheses which must be effected in apparatus of the smallest possible size in which all available space should be occupied by the catalyst. A second disadvantage arises from the fact that the higher the temperature of the gases as they first contact with the catalyst, the more rapidly they will react and the greater will be the evolution of heat; and, this effect being cumulative, the greater will be the chances for excessively high temperatures in the first portions of the catalyst. The bad effects of such high temperatures have previously been pointed out.

It is the object of the invention to provide a method of and apparatus for effecting catalytic exothermic gaseous reactions whereby the entering gases are heated to and maintained at the reaction temperature and the catalyst is at the same time prevented from reaching temperatures which are either so high as to be detrimental thereto or to the efficiency of the reaction, or too low to accomplish the purpose.

Other objects and advantages of the invention will be apparent as it is better understood by reference to the following specification and accompanying drawings, in which Fig. 1 is a cross-sectional view of one form of apparatus adapted for use in the practice of the invention;

Fig. 2 is a similar view of a different form of apparatus; and

Fig. 3 is a similar view of another form of apparatus.

I have discovered that the disadvantages above referred to may be largely eliminated if the heat exchange means employed for warming the incoming gases is filled either wholly or in part with a catalyst for the reaction being carried out. If sufficient catalyst is disposed in this fashion the gases will be in contact with catalyst when and as they first reach reaction temperature, whether that be when they are in the first or last parts of the heat exchange means or when in contact with the main body of catalyst. Since reaction will begin just as soon as the temperature of the gases permits it, there will thus be no unnecessary heat exchange means occupying space which should be filled with catalyst.

My invention also possesses certain noteworthy advantages with respect to the efficacy of the heat exchange means. If the latter contains catalyst, the mass velocity of the gases passing through it will be increased, and, as is well known, such an increase will result in more efficient heat transfer. If the catalyst is present in the heat exchange means, the particles of catalyst will act as baffles for the gases and insure better contact of the gases with the walls through which heat is to be transferred.

I have previously referred to the desirability of preventing development of excessive temperatures in the first portion of the catalyst. In most cases it is found convenient to have the cross-sectional area of the heat exchange passages somewhat smaller than that of the space occupied by the main body of the catalyst. By placing catalyst within the heat exchange means the space velocity of the gases as they first contact with the catalyst will be made higher than the value during subsequent contact. (The space velocity is the hourly gas flow per unit volume of catalyst under standard conditions of temperature and pressure.) This higher space velocity will decrease the violence of the reaction in the first parts of the catalyst and therefore oppose the development of very high temperatures.

The nature of my invention, as well as the advantages described and others which will be obvious to those skilled in the art, will be made clear by the following description of a form of apparatus in which the invention is applied. Referring to Fig. 1 of the drawings, the apparatus comprises a pressure-sustaining wall A enclosing a catalyst chamber B within which is shown tubular heat exchange means C for bringing the gases to reaction temperature by passing them in indirect contact with the catalyst and the reacting gases. The interior of B including the space within the tubes C is filled with catalyst.

The gases which are to react enter the apparatus through the opening D communicating with the annular passage E through which they flow in heat exchange relation to the hot gaseous products of the reaction which are leaving the apparatus in the opposite direction by way of the tube F. From E the gases flow up around the reaction chamber B and between it and the pressure-sustaining wall; thereby simultaneously being warmed by the catalyst in B and protecting the wall A from the heat of the reaction. The gases enter the reaction chamber through a plurality of tubes C; while passing down through these the gases are warmed by heat transfer from the catalyst and preceding portions of reacting gases surrounding the tubes. Leaving the tubes C the gases pass in the reverse direction in contact with the main body of the catalyst. It will be seen that with this arrangement the gases will be able to react as soon as their temperature is sufficiently high even though this occurs before they reach the main portion of the catalyst. The products of the reaction escape from the apparatus through the conduit F.

As I have already indicated, under some circumstances it may be sufficient to fill the heat exchange means such as C only partially with catalyst. In fact, in some cases this may be particularly advantageous, especially if it is done in the special manner which constitutes another phase of my invention. I have found that improved results may be obtained in carrying out exothermic gaseous reactions if catalyst is disposed within the heat exchange means in such a fashion that the gases undergo partial reaction in contact with that catalyst, are then cooled out of contact with catalyst by heat exchange with the main body of the catalyst, and are subsequently brought into direct contact with further catalyst. The advantages of this modification of my invention will be apparent from the following discussion.

Assuming that the gases going to the reaction have been properly warmed, and remembering that a rise in temperature increases the velocity but is unfavorable to the equilibrium of an exothermic reaction, it will be seen that as the warm gases first contact with the catalyst reaction will take place with evolution of heat and more and more rapidly until a balance is established between the temperature attained and the equilibrium conversion corresponding to that temperature. The conversion brought about by further portions of catalyst over which the gases pass will be limited by the extent to which the gases are allowed to cool in contact therewith. As the temperature falls and conversion proceeds accordingly, the reaction is continually opposed by the nearly equilibrium concentration of products already present. Moreover, the process of the reaction is handicapped by this opposing influence throughout the course of the cooling process, and the more so the more nearly the equilibrium conversion is attained at each successively lower temperature.

In connection with the preceding discussion it should be noted that there is a region of maximum reaction and temperature located in the first portions of the catalyst with which the gases contact and that the temperature of the gases in contact with the latter portions falls as the intensity of the reaction diminishes. In fact, I have observed in carrying out the synthesis of ammonia not only that the temperature of the gases decreased markedly after they passed the zone of greatest reactivity but that the last portion of catalyst (amounting to as much as 15% of the whole) was below the reaction temperature.

Under the conditions contemplated in my invention, after the gases have been initially passed over the catalyst, have been removed therefrom and cooled, (but preferably not below the reaction temperature), and are again brought into contact with catalyst, the concentration of products present will be further removed from the equilibrium value than at any point in the cooling process described in the preceding paragraph; therefore, the back pressure effect of the products already formed will be less marked and the total product per unit volume of catalyst will be greater. Further reaction will now take place under somewhat the same conditions and in largely the same way as when the gases first contacted with the catalyst. That is to say, the reaction will proceed with evolution of heat and very rapidly until a balance is established between the temperature attained and the equilibrium conversion corresponding to that temperature. The maximum temperature reached will, of course, be somewhat lower than during the initial passage of the gases through the catalyst. Following this, further conversion of the gases may be effected by allowing them to cool in contact with the catalyst in the usual way.

The cooling which takes place after the first passage of the gases over catalyst I prefer to effect by conducting the gases in heat exchange relation to the catalyst over which they are subsequently to pass. This catalyst is capable of removing heat from the gases since, as has been previously indicated, under the conditions stated only the first portion of this catalyst will be at a maximum temperature and this maximum will normally be lower than the highest temperature obtained by the gases in their first passage over catalyst.

The manner of carrying out the invention will be understood from the following description of its application in the apparatus shown in Fig. 2. The apparatus illustrated consists of a pressure-sustaining wall A surrounding a catalyst chamber B which contains a main body of catalyst C. Within the catalyst chamber B is a U-shaped tubular heat exchange means G for bringing the incoming gases to reaction temperature. The heat exchanger G is partly filled with catalyst K. The gases to react enter the apparatus through the opening D from which they pass through the annular passage E, wherein they are warmed by heat exchange with the oppositely flowing stream of gaseous products in the tube F. From the passage E they flow up between the catalyst chamber and the pressure-sustaining wall, entering the former by way of the heat exchanger G. The heat exchanger G is proportioned and sufficient catalyst is placed therein to insure that the incoming gases will be in contact with catalyst as soon as they have reached reaction temperature. The gases arriving in contact with the catalyst in the heat exchanger G at approximately reaction temperature react exothermically. This continues with rapidly rising temperature until at H the gases pass out of contact with the first portion of the catalyst and, while flowing through the heat exchanger G, are cooled by heat exchange with the main body of the catalyst. An electric heating coil L is provided, by means of which heat may, if necessary, be added to bring the gases to the temperature desired before the gases pass into contact with the main body of the catalyst. Leaving the heat exchanger G the gases flow into contact with the main body of the catalyst. Here they again react with rising temperature until a point is reached at which the temperature begins to fall. Thereafter further conversion occurs only as the gases are allowed to cool in contact with the catalyst. This cooling is produced by means of the cold incoming gases passing in the annular passage J. The gases escape from the apparatus by way of the tube F.

In Fig. 3 is illustrated a second type of apparatus in which my invention is applied. It consists of a pressure-sustaining wall A surrounding a reaction chamber B and a gas inlet and outlet D and F. The reaction chamber B is so arranged as to comprise a main reaction chamber K filled with catalyst and, enclosed therein, a preliminary reaction chamber L likewise filled with catalyst. The gases entering the apparatus through the inlet D pass up through the passage E and thence between the pressure-sustaining wall and the reaction chamber and enter the latter through the conduit M, while passing through which they are warmed by and cool previous portions of the gases which have already partially reacted. Leaving the conduit M by way of the orifices N, the gases contact with catalyst, the preliminary heat exchange being so proportioned that the gases will be at reaction temperature when they contact with catalyst in the reaction chamber L. Here reaction will take place, the gases being withdrawn from the reaction chamber L by way of the passage O before the temperature has become excessive. While passing through the passage O the gases are cooled simultaneously by the entering gases in the conduit M and the main body of the catalyst in the reaction chamber K. The gases entering the reaction chamber K by way of the orifices P are still at or slightly above reaction temperature, so that they will react in contact with the catalyst in the reaction chamber K until a balance is established between the temperature attained and the falling value of the equilibrium conversion. Further reaction will then occur only as the gases are cooled by radiation effects and by heat exchange with the entering gases in the passage O. It is, of course, possible that this cooling may be too great so that the temperature of the gases is below that at which reaction can proceed at a practical rate. My apparatus is designed to take care of this possibility by having the preliminary reaction chamber L (in which heat is developed) in juxtaposition to that portion of the catalyst in the reaction chamber K where there is danger of the temperature becoming too low.

It is desirable to provide some means for temperature control such as an electrical heating coil. This is preferably inserted in the apparatus in such a way that heat is imparted to the incoming gases at a point as near as possible to that at which they first contact with the catalyst.

From the foregoing it will be observed that I have avoided the difficulty of excessive waste space within the catalyst devoted to heat exchange and that I have at the same time provided for the more efficient maintenance of the necessary temperature conditions, particularly with reference to the removal of surplus heat from the catalyst and the distribution of heat at those regions thereof in which there is a tendency to attain a temperature too low for effective conversion.

Various changes can be made in the details of operation and in the structure and arrangement of the catalyst receptacle and heat exchange means without departing from the invention or sacrificing any of the advantages thereof.

I claim:—

1. The method of effecting catalytic exothermic gaseous reactions, which includes conducting the entering gaseous mixture at a temperature initially lower than that required for the active commencement of the reaction within and in heat exchange relation to a main body of catalyst and simultaneously in contact with another portion of catalyst, adding heat to the gases from an external source and thereafter passing them through and in direct contact with the main body of catalyst.

2. The method of effecting catalytic exothermic gaseous reactions, which includes conducting the entering gaseous mixture in heat exchange relation to gases which have already partially undergone reaction, passing them in contact with a portion of catalyst and simultaneously in heat exchange relation to a main body of catalyst, thereafter out of contact with catalyst and simultaneously in heat exchange relation to the main body of catalyst and succeeding portions of gases which have not reacted, and thereafter into direct contact with a main body of catalyst.

3. The method of effecting catalytic exothermic gaseous reactions, which includes conducting the entering gaseous mixture in heat exchange relation to gases which have already partially undergone reaction, passing them in contact with a portion of catalyst and simultaneously within and in heat exchange relation to a main body of catalyst, thereafter out of contact with catalyst and simultaneously in heat exchange relation to the main body of catalyst and succeeding portions of gases which have not reacted, and thereafter into direct contact with a main body of catalyst.

In testimony whereof I affix my signature.

ROGER WILLIAMS.